United States Patent
Croset et al.

3,820,871
June 28, 1974

[54] SHORT WAVELENGTH WAVEGUIDES FORMED OF METAL OXIDES

[75] Inventors: Michel Croset; Gonzalo Velasco, both of Paris, France

[73] Assignee: Thomson-CSF, Paris, France

[22] Filed: Aug. 10, 1972

[21] Appl. No.: 279,360

[30] Foreign Application Priority Data
Sept. 16, 1971   France .............................. 71.33390

[52] U.S. Cl. ........................ 350/96 WG, 65/DIG. 7
[51] Int. Cl. ............................................. G02b 5/14
[58] Field of Search ........................... 350/96 WG

[56] References Cited
UNITED STATES PATENTS
3,589,794   6/1971   Marcatili ...................... 350/96 WG
3,659,915   5/1972   Maurer et al. ................ 350/96 WG OTHER PUBLICATIONS
Hensler et al. "Optical Propagation in Sheet and Pattern Generated Films of $Ta_2O_5$," Applied Optics Vol. 10, No. 5, pp. 1037-1042, May 1971.

*Primary Examiner*—John K. Corbin
*Attorney, Agent, or Firm*—Cushman, Darby & Cushman

[57] ABSTRACT

A light waveguide is formed by atomising under vacuum and deposition upon a substrate, of a metal such for example as tantalum, in an atmosphere comprising a gas capable, in association with the metal, of forming a chemical combination, oxygen in the case of tantalum. The deposit is a complex compound of the metal and of the gas if the gas pressure is insufficient to produce the desired chemical combination (tantalum pentoxide $Ta_2O_5$); the assembly, after appropriate masking, is subjected to a chemical process which converts the unprotected parts into said combination.

8 Claims, 5 Drawing Figures

SHORT WAVELENGTH WAVEGUIDES FORMED OF METAL OXIDES

It is well known that light waveguides can be constituted by tubes of rectangular cross-section for example, made of transparent materials and having transverse sectional dimensions at least in the same order of magnitude as the wavelength being transmitted.

These waveguides are generally made of a transparent material whose refraction index is higher than that of the external medium; the light rays striking the walls of the guide at an angle of incidence differing substantially from the normal, are reflected back to the interior of the waveguide as a consequence of the phenomenon of total reflection.

It is clear that it is difficult to produce waveguides of this kind and, in particular, it has not thus far been possible to correctly produce such waveguides by methods similar to the integration techniques utilised in semiconductor circuitry.

The object of the present invention is waveguides of this kind and the method of their manufacture.

It likewise relates to the method of manufacturing circuits made of waveguides of this kind.

The invention will be beter understood from a consideration of the ensuing description and by reference to the attached drawings in which.

The invention constitutes an application of the techniques of deposition under vacuo.

The principle is as follows:

In an evacuated enclosure, for example by cathode-sputtering, or vaporising, a flow of metal particle is generated and these deposited upon a substrate. If, during operation, there is introduced at a predetermined partial pressure into the enclosure, a gas capable of reacting with the metal, the resultant deposit will be a complex compound and its refractive index vis-a-vis light rays, in respect of which it is transparent, will range from a value $N_0$ corresponding to the refractive index of the metal to a value $n_o$ which is the refractive index of the chemical compound of metal and gas. This latter combination will be obtained if the partial pressure $P_o$ of the gas is sufficient to produce the stoichiometric combination in question.

In other words, as long as the partial pressure does not reach the value $P_o$, the index of the deposit $n$ will be variable, $n = f(P)$, $n$ varying from $N_0$ to $n_o$ for P ranging from O to $P_o$.

In the following, it will be assumed by way of non-limitative example that the metal is tantalum and the reactive gas, oxygen. The invention is equally applicable to zirconium and oxygen.

The compound of tantalum and oxygen is tantalum pentoxide $Ta_2O_5$.

For $0 < P < P_o$, the index will vary from $N_0 = 3.3$ being the index of tantalum, to $n_o = 2.2$ being the index of tantalum oxide.

This being so, the invention consists in producing waveguides in a medium having a high refractive index, which waveguides are embedded in a plate exhibiting a lower refractive index, for example waveguides obtained by deposition at a pressure $P < P_o$ of a sub-stoechiometric compound of oxygen embedded in stoechiometric tantalum oxide.

Figure 1:
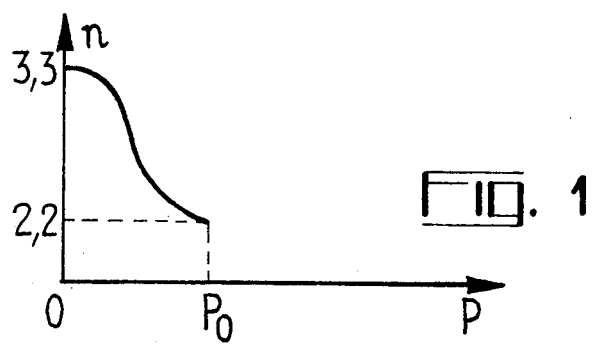
FIG. 1 is an explanatory graph.

FIG. 1 illustrates the variations of $n$ as a function of P, in a deposit obtained by reactive cathode-sputtering of tantalum in the presence of oxygen. For P = 0, the index is $N_0 = 3.3$, this being the index of tantalum. For $P = P_o$, the index is $n_o = 2.2$, this being the index of tantalum oxide. For $0 < P < P_o$, the index is $N = f(P)$, N being a steady function decreasing from $N_0$ for P = 0, to $n_o$ for $P = P_o$.

Figure 2:
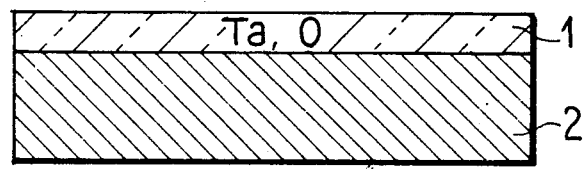
FIGS. 2 and 3 show in transverse section a waveguide in accordance with the invention during the course of stages in the manufacturing process, which latter likewise forms part of the object of the invention.
Figure 3:
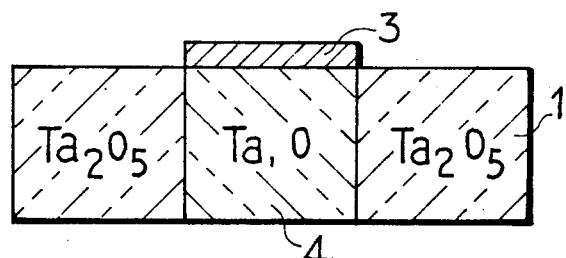

In FIGS. 2 and 3, the stages involved in the manufacture of the waveguide in accordance with the invention have been illustrated.

In FIG. 2, the oxygen admission pressure being $P < P_o$, but closer to $P_o$ than to 0, a deposit of a complex compound of tantalum and oxygen, 1, has been produced upon a substrate 2, for example of silicon, the substrate 2 subsequently possibly being eliminated.

On this deposit, by using a masking technique, an aluminium layer 3, FIG. 3, has been deposited in a predetermined zone.

The system is then subjected to a suitable heat-treatment, for example heating to 500° C in an oxygen atmosphere. The masked part 4 remains intact. The unmasked part is converted into tantalum pentoxide. Although the thickness of the deposit is small, in the order of 0.1 to 1 $\mu$, the walls of the region 4 are perfectly reproducible from one end of the waveguide to the other.

Figure 4:
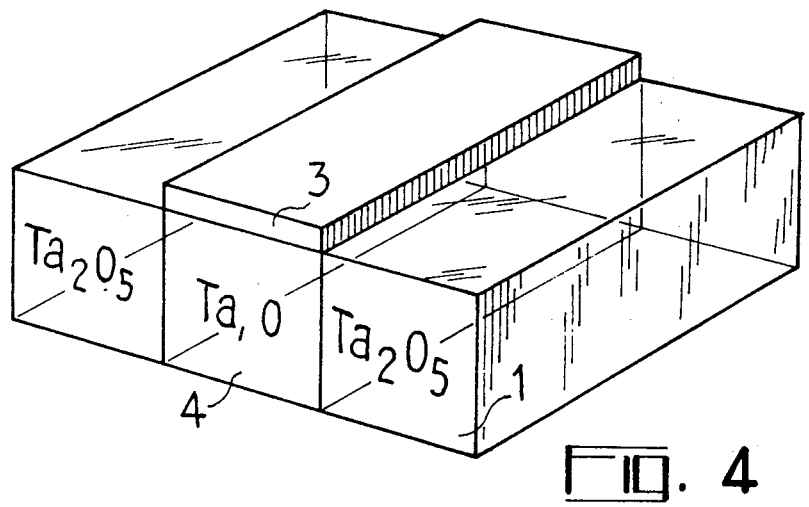
FIG. 4 shows a waveguide of this kind in prespective.

The aluminium layer having a width in the order of that of the substrate thickness, in FIG. 4 the medium 4 of virtually rectangular cross-section and index $n$, greater than 2.2 is to be found embedded in a medium of index 2.2. This medium 4 thus fulfils the conditions required to form a light waveguide since its refractive index is higher than that of the surrounding medium; the aluminium layer can be removed. If it is left, it acts as a mirror in the same way as the substrate itself.

Figure 5:
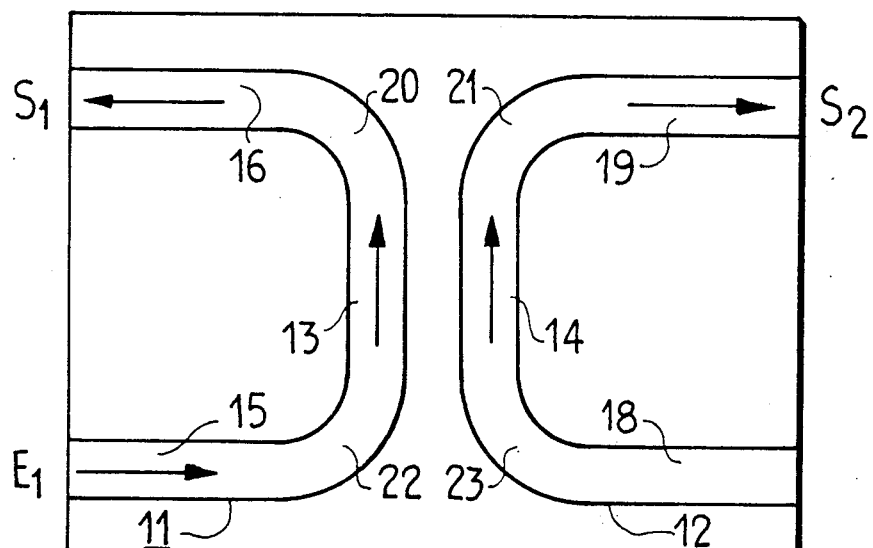
FIG. 5 illustrates a directional coupler produced using waveguides in accordance with the invention.

FIG. 5 illustrates a plan view of a directional coupler comprising two waveguides 11 and 12 having the same rectangular cross-section, similar to the guide of FIG. 4. These two waveguides are integrated into the same substrate in one and the same tantalum oxide wafer. They are formed simultaneously and are made of the same dielectric medium. They have two mutually parallel rectilinear portions 13 and 14 of the same length, disposed opposite one another. These two rectilinear portions are spaced apart by a distance substantially equal to their width.

The waveguide 11 has an input E1 at which the light enters and an output S1. The waveguide 12 has an output S2 and the two waveguides have respective portions 15 (in which the input E1 is located) and 18, perpendicular to portions 13 and 14 and located in extension of one another.

The same applies to the portions 16 and 19. These portions are connected to the portions 13 and 14 by curved portions 20, 21, 22 and 23. The assembly has been introduced by masking using aluminum layers, in the manner indicated hereinbefore.

Theory demonstrates, and experience confirms that if the input E1 is excited, there is an energy transfer from E1 to S2 through the medium of an evanescent wave propagating through the intermediate medium in a manner similar to that taking place in microwave directional couplers.

The invention is not limited to the examples described, of course.

What we claim is:

1. A waveguide for supra high frequency electromagnetic radiation, comprising a transparent medium of refractive index $n$, embedded in another transparent medium of refractive index N, where $N<n$, one of said two transparent media being a complex compound of a solid and a gaseous element capable of reacting with said solid element, thus forming therewith a predetermined chemical combination, said complex compound having a combination which differs from that of said chemical combination, the other transparent medium being formed by said chemical combination.

2. A waveguide as claimed in claim 1, wherein said solid element is a metal.

3. A waveguide as claimed in claim 2, wherein said metal has a higher refractive index than said chemical combination, and said compound has a refractive index which decreases when the proportion of gas in said compound increases, up to the point at which the stoechiometric ratio for the formation of said combination is reached.

4. A waveguide as claimed in claim 3, wherein said metal is tantalum, the gas oxygen, the combination tantalum pentoxide.

5. A waveguide as claimed in claim 3, wherein said metal is zirconium the gas oxygen, the combination zirconium oxide $ZrO_2$.

6. A system of identical waveguides in accordance with claim 2, integrated into one and the same layer of said chemical combination.

7. A system as claimed in claim 6, comprising two waveguides having parallel rectilinear portions of the same length located opposite one another and separated by an interval in order thus to form a directional coupler.

8. A waveguide as claimed in claim 1, characterized in that its cross-section is substantially rectangular.

* * * * *